US008990528B2

(12) United States Patent  
McAllister et al.

(10) Patent No.: US 8,990,528 B2
(45) Date of Patent: Mar. 24, 2015

(54) METHOD FOR FAST FORMAT OF A FULLY ALLOCATED VOLUME WHEN COPIED FROM A SPACE EFFICIENT VOLUME

(75) Inventors: Cameron McAllister, Hampshire (GB); Peter Eccles, Winchester (GB); Hedley Proctor, High Wycombe (GB); William James Scales, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 1439 days.

(21) Appl. No.: 12/349,199

(22) Filed: Jan. 6, 2009

(65) Prior Publication Data

US 2010/0174880 A1   Jul. 8, 2010

(51) Int. Cl.
*G06F 12/00* (2006.01)
*G06F 3/06* (2006.01)

(52) U.S. Cl.
CPC .............. *G06F 3/065* (2013.01); *G06F 3/0607* (2013.01); *G06F 3/0689* (2013.01); *G06F 3/0617* (2013.01)
USPC .......................................... 711/162; 711/161

(58) Field of Classification Search
CPC ... G06F 3/0607; G06F 3/0602; G06F 3/0617; G06F 3/065; G06F 3/0689
See application file for complete search history.

(56) References Cited

U.S. PATENT DOCUMENTS

| 7,555,504 | B2 * | 6/2009 | Bixby et al. ........................ 1/1 |
| 7,640,408 | B1 * | 12/2009 | Halligan et al. .............. 711/162 |
| 7,725,631 | B2 * | 5/2010 | Ogawa et al. .................. 710/74 |
| 2003/0028737 | A1 * | 2/2003 | Kaiya et al. .................. 711/162 |
| 2007/0283111 | A1 | 12/2007 | Berkowitz et al. |
| 2009/0262450 | A1 * | 10/2009 | Hsiao et al. .................... 360/75 |

OTHER PUBLICATIONS

John Catsoulis. 2005. Designing Embedded Hardware (2 ed.). Andy Oram (Ed.). O'Reilly & Associates, Inc., Sebastopol, CA, USA.*

* cited by examiner

*Primary Examiner* — Matthew Bradley
*Assistant Examiner* — Ramon A Mercado
(74) *Attorney, Agent, or Firm* — Scully, Scott, Murphy & Presser, P.C.

(57) ABSTRACT

A computer system for fast format or reproducing data of a computer data storage device includes a computer system executing a reproducing process for reproducing data. A source disk (Ds) data storage device and a target disk (Dt) data storage device have data communication between each other and communicate with the computer system. The Ds data is reproducible to the Dt, and the Ds has blank regions with no data which corresponds to zero. The Ds having data regions and an intermediary flash copy map (D0) is generated by the program having all logical zeros for copying blank regions in the Ds to the Dt. The Ds is disengaged from reproducing after all data regions are copied from the Ds to the Dt. The reproducing of the Ds to the Dt continues after disengaging the Ds from the reproducing process by copying the zeros of the D0 to the Dt.

3 Claims, 2 Drawing Sheets

METHOD FOR FAST FORMAT OF A FULLY ALLOCATED VOLUME WHEN COPIED FROM A SPACE EFFICIENT VOLUME

FIELD OF THE INVENTION

The present invention relates to a method and system for reproducing data of a computer data storage device, and more particularly, relates to a method, and system for employing the method, for fast format and reproducing data of a fully allocated volume.

BACKGROUND OF THE INVENTION

In current data copying methods and/or systems, for example, a point in time copy of a data storage disk or device in a storage system such as switched virtual circuit (SVC), launch a background process to copy the data from an old disk (source device or disk) to a new disk (target device or disk). While the background process is copying, the method redirects reads of the new disk to the old disk. However if the source disk is space efficient, it will have a potentially large number of unallocated blank regions. If the target disk is fully allocated, these blank regions on the source disk will have to be copied across as zeros to the target disk. This process is disadvantageous when the source disk only has a small amount of real data on it in comparison to the total size of the data storage disk, because the source disk will need to remain part of the copy process while large amounts of zeros (representing blank or empty space on the data storage disk) are being written to the target disk. The source disk is thereby unable to resume normal operations while it is engaged and retained in the copying process, resulting in undesirable data retrieval times for data on the source disk.

Therefore, it would be desirable to provide a method, and system employing the method, for copying data from a source device to a target device without retaining the source device in the copying process while unallocated blank storage regions are copied to the target device.

SUMMARY OF THE INVENTION

A method for copying data from a computer data storage device includes: providing a computer system; providing a source disk (Ds) data storage device and a target disk (Dt) data storage device having data communication between each other, the Ds and the Dt electrically communicating with the computer system; generating a intermediary flash copy map (D0) logically full of zeros; copying data from the Ds to the Dt; detecting a blank region in the Ds; indicating copy of blank region completed to D0; finishing copying of data from Ds to Dt; removing Ds from flash copy map; and copying zeros from D0 to Dt representing blank regions in the Ds.

In a related aspect, the method further comprises: generating a plurality of bitmaps each having one bit for each grain on the Ds for copying; and initializing the bits in each bitmap to zero. The method may further include: correlating the grains of Ds with the bits in a first bitmap; correlating the grains of Dt with bits in a second bitmap; correlating the bits between the first and second bitmaps in relation to the copying status of the grains from Ds to Dt. A phase one may be completed when all the bits in the first bitmap are a logical 1, and a phase two may be completed when all the bits in the second bitmap are a logical 1. The step of removing the source disk (Ds) from the flash copy map may occur after phase one is complete. The step of copying zeros from D0 to Dt may be complete when phase two is complete. In another related aspect, the steps after providing the source disk (Ds) are executed using a computer program embodied on computer readable medium in the computer system, and the computer system includes a processor for executing the program. The step of copying data from Ds to Dt may include fast formatting Dt.

In another aspect of the invention, a computer system for fast format or reproducing data of a computer data storage device includes a computer system executing a reproducing process for reproducing data. The computer system includes a computer program embodied on computer readable medium in the computer system, and the computer system includes a processor for executing the program. A source disk (Ds) data storage device and a target disk (Dt) data storage device have data communication between each other, and the Ds and the Dt electrically communicate with the computer system. The Ds data is reproducible to the Dt and the Ds having blank regions with no data which corresponds to zero. The Ds having data regions, and an intermediary flash copy map (D0) generated by the program having all logical zeros for copying blank regions in the Ds to the Dt by representing the blank regions as zeros. The Ds is disengaged from reproducing after all data regions are copied from the Ds to the Dt.

In a related aspect, the reproducing of the Ds to the Dt continues after disengaging the Ds from the reproducing process by copying the zeros of the D0 to the Dt.

In another aspect of the invention, a computer program product for use with a computer includes a computer readable medium having recorded thereon a computer program or program code for causing the computer to perform a method for fast format of a computer data storage device. A source disk (Ds) data storage device and a target disk (Dt) data storage device have data communication between each other, and the Ds and the Dt electrically communicate with the computer, the method comprising the steps of: generating a intermediary flash copy map (D0) logically full of zeros; copying data from the Ds to the Dt; detecting a blank region in the Ds; indicating copy of blank region completed to D0; finishing copying of data from Ds to Dt; removing Ds from flash copy map; and copying zeros from D0 to Dt representing blank regions in the Ds.

In a related aspect, the computer program product further includes: generating a plurality of bitmaps each having one bit for each grain on the Ds for copying; and initializing the bits in each bitmap to zero. In another related aspect, the computer program product further includes: correlating the grains of Ds with the bits in a first bitmap; correlating the grains of Dt with bits in a second bitmap; and correlating the bits between the first and second bitmaps in relation to the copying status of the grains from Ds to Dt. A phase one series of steps may be completed when all the bits in the first bitmap are a logical 1, and a phase two series of steps may be completed when all the bits in the second bitmap are a logical 1. The step of removing the source disk (Ds) from the flash copy map may occur after phase one is complete. The step of copying zeros from D0 to Dt may be completed when phase two is complete.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF THE INVENTION

Figure 1:
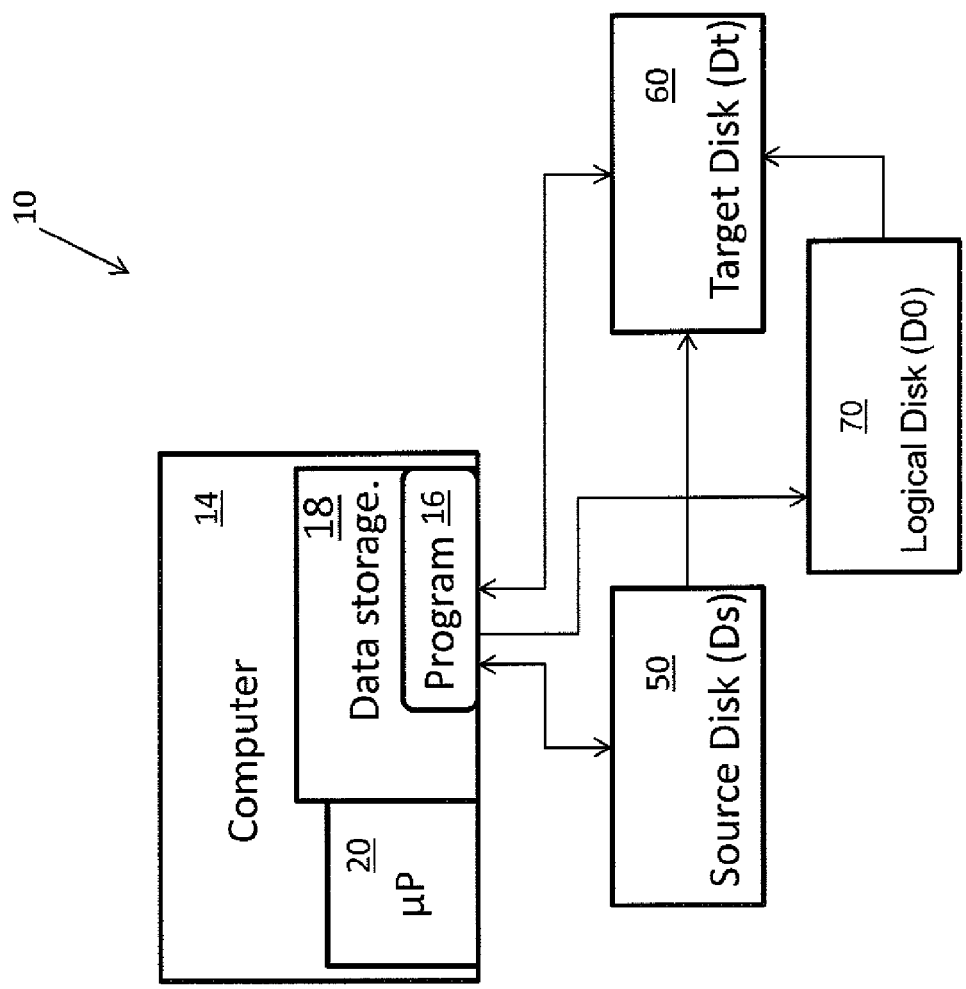
FIG. 1 is a block diagram according to an embodiment of the invention depicting a computer connected to source and target disks and communicating with a logical disk.

Referring to FIG. 1 in an illustrative embodiment of the invention, a method and system 10 employing the method, is provided for creating a copy or a fast format of a source device to a target device. The fast format may include file formatting of the target disk and copying all or part of the data from a source disk to the target disk. In the embodiment of FIG. 1, the method and system creates a flash (or instant) copy map with the source device embodied as a source disk (Ds) 50 being space efficient and the target device embodied as a fully allocated target disk (Dt) 60 (such as, Ds-->Dt). A computer program is embodied as virtualization software 16 and is recorded on a computer readable medium embodied as a data storage device 18. The virtualization software 16 causes the computer 14 to perform a method for creating an intermediary flash copy map to a special/virtual disk (D0) 70 that doesn't physically exist, but is logically full of zeros (for example, Ds-->D0-->Dt).

When the flash copy map is started, all grain (or data) splits that occur cause the grain to be copied straight through D0 70 (without a write to D0) to Dt 60. When the background copy process reaches the unallocated blank regions, the method marks or indicates that blank region has been copied to D0 70 (but not to Dt), and moves to the next region. When all the real data from the source Ds 50 is copied, then the source disk 50 is removed from the flash copy map, and the method starts copying zeros from D0 70 to Dt 60 which relate to the unallocated blank regions. One advantage of the invention is that the source disk Ds 50 will be removed from the flash copy map before all the blank regions have been written to Dt 60 as zeros. Therefore, the source disk 50 will be removed from the flash copy map faster and is thereby available for such things as deletion, resizing, etc, which aren't allowed while it's part of a flash copy map.

Figure 3:
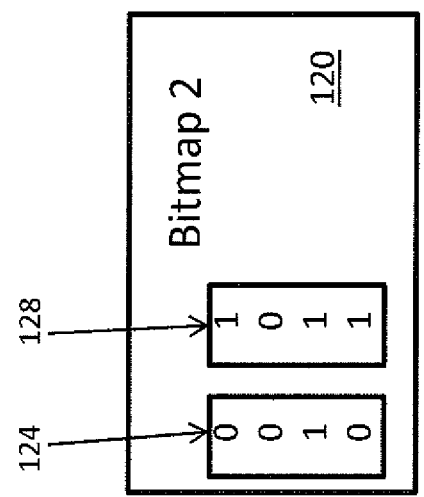
FIGS. 2-3 are block diagrams of bitmaps used in a data copying process according to the invention and related to the source and target disks shown in FIG. 1.
Figure 2:
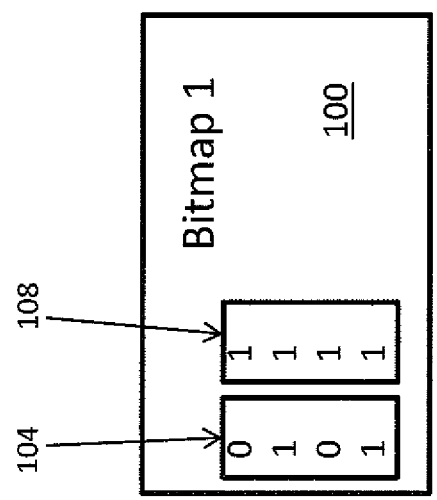

Further, referring to FIG. 1-3, in the illustrative embodiment of the present invention, the system and method 10 includes creating a flash copy mapping between the space efficient source disk (Ds) 50 and the fully allocated target disk (Dt) 60. Two bitmaps are created (b1 100 and b2 120), each bitmap contains one bit for each grain of the source disk 50 to be copied, each of the bits in both bitmaps are initialized to 0 (for example, Ds--b1-->D0--b2-->Dt). Logical disk D0 70 does not physically exist, and is logically full of zeros.

A bit of bit block 104 in b1 100 is:
0 if the corresponding grain of Ds 50 has not been read yet;
1 if the corresponding grain of Ds 50 has been read, so either
  i) data exist and therefore has been written to Dt 60; or
  ii) data does not exist, zeros (D0) may or may not have been written to Dt 60.

A bit of bit block 124 in b2 120 is:
0 if the corresponding grain of Dt 60 has not been written yet, so either
  i) Ds 50 have not been read yet; or
  ii) Ds 50 have been read and data does not exist, therefore zeros (D0) 70 need to be written to Dt 60; and
1 if the corresponding grain of Dt 60 has been written.

Referring to FIGS. 2 and 3, illustrative embodiments of bitmap 1 100 and bitmap 2 120 include bit blocks (or sample states) 104, 108 and bit blocks (or sample states) 124, 128, respectively, which depict sample states 104, 108 of bitmap 1 100 and sample states 124, 128 of bitmap 2 120. When the program starts the flash copy, a background copy process starts which has two phases. During phase one, b1 100 is processed, if a bit is 0 (as shown in bit block 104), then the program reads the corresponding grain of Ds 50. If data exists, the program writes the grain to Dt 60, once the write has completed the program sets the corresponding bit in b1 (as shown in bit block 108) and b2 to 1 (as shown in bit block 124). If data does not exists, the program sets the corresponding bit in b1 to 1 and leaves b2 as 0, as shown in bit blocks 108 and 128, respectively.

Phase one is over when all bits in b1 100 are 1. At this point, the program does not need to read the space efficient source disk (Ds) 50 and this can be freed up from the flash copy map. The background copy process moves on to phase two. During phase two the program accesses b2 120. If a bit is 0 then the program writes zeros (D0) 70 to the corresponding grain of the fully allocated target 60. Phase two is over when all bits in b2 120 are 1.

While generating the background copy, reads and writes to the source disk 50 and target disk 60 are handled or executed as followings:

---

A read to Ds 50;
  Return Ds 50;
A read to Dt 60;
  If b2 is 1 then return Dt 60;
  else if b1 is 1 then return zeros D0 70;
  else return Ds 50;
A write to Ds 50;
  If b1 is 1 then write to Ds 50;
  else, read Ds 50;
    if data exists then copy it to Dt 60, set b1 and b2 to 1 then perform the write to Ds 50;
    else (data does not exist), set b1 to 1 then perform the write to Ds 50;
A write to Dt 60;
  If b2 is 1 then write to Dt 60;
  else if b1 is 1 then fill Dt 60 with zeros D0 70, set b2 to 1, then perform the write to Dt 60;
  else copy the grain from Ds 50 to Dt 60, set b1 and b2 to 1, then perform the write to Dt 60.

---

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein but falls within the scope of the appended claims.

What is claimed is:

1. A method for copying data from a computer data storage device, comprising:
providing a computer system;
providing a source disk (Ds) data storage device and a target disk (Dt) data storage device having data communication between each other, the Ds and the Dt electrically communicating with the computer system;
generating an intermediary flash copy map virtual disk (D0) logically full of zeros;
detecting blank regions in the Ds;
indicating a copy of each of the blank regions completed to D0;
detecting data regions on the Ds;
only copying data from the data regions from the Ds to the Dt;

finishing copying of the data from the data regions from Ds to Dt;

removing Ds from the intermediary flash copy map;

copying zeros from D0 to Dt representing only the blank regions in the Ds;

wherein the step of copying data from Ds to Dt includes fast formatting Dt;

generating a plurality of bitmaps each having one bit for each grain on the Ds for copying;

initializing the bits in each bitmap to zero;

correlating the grains of Ds with the bits in a first bitmap;

correlating the grains of Dt with bits in a second bitmap; and correlating the bits between the first and second bitmaps in relation to the copying status of the grains from Ds to Dt;

wherein a phase one is completed when all the bits in the first bitmap are a logical 1, and a phase two is completed when all the bits in the second bitmap are a logical 1;

wherein the step of removing the source disk (Ds) from the flash copy map occurs after phase one is complete;

wherein the step of copying zeros from D0 to Dt is complete when phase two is complete.

2. A computer system for fast format or reproducing data of a computer data storage device, comprising:

a computer system executing a reproducing process for reproducing data, the computer system including a computer program embodied on computer readable medium in the computer system, and the computer system including a processer for executing the program;

a source disk (Ds) data storage device and a target disk (Dt) data storage device having data communication between each other, and the Ds and the Dt electrically communicating with the computer system, the Ds data being reproducible to the Dt and the Ds having blank regions with no data corresponding to zero, and the Ds having data regions, wherein only the data from the data regions of the Ds are copied to the Dt; and an intermediary flash copy map virtual disk (D0) generated by the program having all logical zeros for only copying blank regions in the Ds to the Dt by representing the blank regions as zeros, and the Ds being disengaged from reproducing after all data regions are copied from the Ds to the Dt;

wherein reproducing the Ds to the Dt continues after disengaging the Ds from a reproducing process by copying the zeros of the D0 to the Dt;

wherein a plurality of bitmaps each have one bit for each grain on the Ds for copying, the bits in each bitmap are initialized to zero, the grains of Ds are correlated with the bits in a first bitmap, the grains of Dt are correlated with bits in a second bitmap; the bits between the first and second bitmaps are correlated in relation to the copying status of the grains from Ds to Dt; a phase one is completed when all the bits in the first bitmap are a logical 1, and a phase two is completed when all the bits in the second bitmap are a logical 1, the source disk (Ds) are removed from the flash copy map after phase one is complete, and copying zeros from D0 to Dt is complete when phase two is complete.

3. A computer program product for use with a computer, the computer program product including a non-transitory computer readable medium having recorded thereon a computer program or program code for causing the computer to perform a method for fast format of a computer data storage device, a source disk (Ds) data storage device and a target disk (Dt) data storage device have data communication between each other, the Ds and the Dt electrically communicating with the computer, the method comprising the steps of:

generating a intermediary flash copy map virtual disk (D0) logically full of zeros;

detecting blank regions in the Ds;

indicating a copy of each of the blank regions completed to D0;

detecting data regions on the Ds;

only copying data from the data regions from the Ds to the Dt;

finishing copying of the data from the data regions from Ds to Dt;

removing Ds from flash copy map;

copying zeros from D0 to Dt representing only the blank regions in the Ds;

generating a plurality of bitmaps each having one bit for each grain on the Ds for copying;

initializing the bits in each bitmap to zero;

correlating the grains of Ds with the bits in a first bitmap;

correlating the grains of Dt with bits in a second bitmap; and correlating the bits between the first and second bitmaps in relation to the copying status of the grains from Ds to Dt;

wherein a phase one series of steps are completed when all the bits in the first bitmap are a logical 1, and a phase two series of steps are completed when all the bits in the second bitmap are a logical 1;

wherein the step of removing the source disk (Ds) from the flash copy map occurs after phase one is complete;

wherein the step of copying zeros from D0 to Dt is complete when phase two is complete.

* * * * *